No. 767,054. Patented August 9, 1904.

UNITED STATES PATENT OFFICE.

HIRAM M. HANMORE, OF LOS ANGELES, CALIFORNIA.

COMPOSITION FOR BRICKS FOR BUILDING PURPOSES.

SPECIFICATION forming part of Letters Patent No. 767,054, dated August 9, 1904.

Application filed January 13, 1903. Serial No. 138,915. (No specimens.)

*To all whom it may concern:*

Be it known that I, HIRAM M. HANMORE, a citizen of the United States, and a resident of Los Angeles, in the county of Los Angeles and State of California, have invented a new and useful Composition for Bricks for Building Purposes, of which the following is a specification.

My new composition for bricks for building purposes is composed of a mixture of diatomaceous earth, calcic oxid, and aluminium clay. The proportions of these ingredients may be varied to some extent without materially changing the character of the composition; but the proportions which I prefer are as follows, by weight: diatomaceous earth, sixty-five parts; calcic oxid, thirty parts; aluminium clay, five parts.

For the manufacture of composition the several ingredients are ground to powder and after having been thoroughly mixed together sufficient water is added and mixed with them to form a mass of sufficient consistency to be molded by an ordinary brick-machine or in any manner practicable in the manufacture of bricks from clay. The bricks thus molded are dried in a kiln or in the sun or otherwise in the open air and when thoroughly dried are ready without firing for use for all purposes in which ordinary bricks are used. They weigh less than half the ordinary brick and will withstand a much greater heat. They have great tensile strength and fire-resisting properties.

What I claim as my invention is—

A composition for bricks for building purposes comprising diatomaceous earth, calcic oxid and aluminium clay in which the calcic oxid is in excess of the clay and the diatomaceous earth is in excess of the calcic oxid.

In testimony that I claim the foregoing as my invention I have signed my name, in presence of two witnesses, this 2d day of January, 1903.

HIRAM M. HANMORE.

Witnesses:
GEO. B. HANNAMAN,
GEO. T. GILLETTE.